(12) United States Patent
Richard (10) Patent No.: US 7,913,576 B1
(45) Date of Patent: Mar. 29, 2011

(54) FLOW SCALE WITH BASKET FEATURE

(76) Inventor: Clarence Richard, Minnetonka, MN (US)

( * ) Notice: Subject to any disclaimer, the term of this patent is extended or adjusted under 35 U.S.C. 154(b) by 0 days.

(21) Appl. No.: 12/555,577

(22) Filed: Sep. 8, 2009

Related U.S. Application Data (60) Provisional application No. 61/191,384, filed on Sep. 8, 2008.

(51) Int. Cl.
*G01F 1/30* (2006.01)
(52) U.S. Cl. .................................................... 73/861.73
(58) Field of Classification Search ............... 73/861.73; 177/119, 16
See application file for complete search history.

(56) References Cited

U.S. PATENT DOCUMENTS

| | | |
|---|---|---|
| 764,705 A | 7/1904 | Bousser |
| 771,764 A | 10/1904 | Bousser |
| 2,047,203 A | 7/1936 | Henson |
| 3,056,293 A | 10/1962 | Ofner |
| 3,212,330 A | 10/1965 | De Pollier |
| 3,232,486 A | 2/1966 | Ofner |
| 3,269,181 A | 8/1966 | Seay |
| 3,611,803 A | 10/1971 | Kajirua et al. |
| 3,640,135 A | 2/1972 | Tomiyasu et al. |
| 3,640,136 A | 2/1972 | Nolte |
| 3,939,709 A | 2/1976 | Echtler |
| 3,945,532 A | 3/1976 | Marks |
| 4,042,220 A | 8/1977 | Humkey et al. |
| 4,157,661 A | 6/1979 | Schindel |
| 4,718,285 A | 1/1988 | Pfeiffer |
| 5,065,632 A | 11/1991 | Reuter |
| 5,698,794 A | 12/1997 | Bussian |
| 5,798,466 A | 8/1998 | Satake et al. |
| 5,895,865 A | 4/1999 | Ozawa |
| 6,616,527 B2 | 9/2003 | Shinners et al. |
| 6,679,125 B1 | 1/2004 | Brandt, Jr. |
| 6,805,014 B1 | 10/2004 | Shyy et al. |
| 6,806,429 B2 * | 10/2004 | Carlson .......................... 177/16 |
| 6,892,586 B1 | 5/2005 | Welch et al. |
| 6,973,843 B2 | 12/2005 | Shyy et al. |
| 7,007,557 B1 | 3/2006 | Richard |

FOREIGN PATENT DOCUMENTS

| | | |
|---|---|---|
| SU | 1714370 A1 | 2/1992 |
| WO | WO2007/128352 A1 | 11/2007 |

OTHER PUBLICATIONS

Sentran, LLC, "YJ Single Point Load Cell", date unknown (2 pages).

\* cited by examiner

*Primary Examiner* — Jewel Thompson
(74) *Attorney, Agent, or Firm* — Kinney & Lange, P.A.

(57) ABSTRACT

A flow scale apparatus includes a substantially vertical flow path along which material can flow, a plurality of spreader baffles substantially aligned horizontally and positioned in the flow path, a plurality of basket baffles located downstream from the spreader baffles in the flow path and substantially aligned horizontally, and a sensor. The basket baffles are secured together and configured to be displaceable such that portions of the material in the flow path contact each of the basket baffles to displace the basket baffles relative to the spreader baffles as a function of a weight of the material in the flow path. The sensor is configured for sensing displacement of the basket baffles and generating an output signal.

20 Claims, 6 Drawing Sheets

FLOW SCALE WITH BASKET FEATURE

CROSS-REFERENCE TO RELATED APPLICATION(S)

This application claims the benefit of U.S. Provisional Application Ser. No. 61/191,384, filed on Sep. 8, 2008, which is hereby incorporated by reference in its entirety.

BACKGROUND

The present invention relates to flow scales for sensing the flow of solid materials.

In a variety of applications, it is frequently desirable to measure characteristics of a flow of solid materials, such as granular and powdered materials, without significantly interrupting the flow. Flow scale designs are known that incorporate an impact plate disposed substantially vertically, for example, U.S. Pat. No. 7,007,557 entitled "An Impact Flow Scale Having A Hingedly Suspended Impact Plate". The flow of solid materials is directed against the impact plate whereupon a horizontal force component exerted upon the impact plate by varying densities and amounts of impacting material is detected by a force measuring device. When combined with weight data from another scale, information such as the flow rate and the weight of solid materials displaced can be determined.

Many prior art flow scales take up a relatively large amount of vertical space, which can limit their use for some applications. For example, some prior art flow scales can require 0.609-1.219 meters (2-4 feet) of vertical installation space. Provision of such a large amount of vertical installation space can necessitate undesirable facility redesign, including the burdensome task of raising existing structures to greater heights to accommodate the addition of a flow scale, making such devices costly and impractical to use. In particular, some prior art devices utilize a spreader cone that feeds a concave ring connected to a sensing device. However, such configurations generally require the sensing device to be located underneath the spreader cone, which tends to increase the vertical height of the device, particularly where the sensing device is a load cell not easily fit inside a cone. Moreover, locating a sensing device below a spreader cone requires routing wires away from a center of material flow, and efforts to protect such wiring from abrasive effects of the material flow can lead to measurement inaccuracies.

Thus, it is desired to provide an alternative flow scale with relatively compact vertical dimensions that still provides for relatively accurate and reliable flow sensing.

SUMMARY

A flow scale apparatus according to the present invention includes a substantially vertical flow path along which material can flow, a plurality of spreader baffles substantially aligned horizontally and positioned in the flow path, a plurality of basket baffles located downstream from the spreader baffles in the flow path and substantially aligned horizontally, and a sensor. The basket baffles are secured together and configured to be displaceable such that portions of the material in the flow path contact each of the basket baffles to displace the basket baffles relative to the spreader baffles as a function of a weight of the material in the flow path. The sensor is configured for sensing displacement of the basket baffles and generating an output signal.

While the above-identified drawing figures set forth embodiment(s) of the present invention, other embodiments are also contemplated, as noted in the discussion that follows. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

In general, the present invention provides a flow scale for measuring flows of solid materials. The flow scale can spread a generally vertically falling flow of material into a plurality of subflows with baffles of a fixed spreader assembly. The spreader assembly can cause the material subflows to diverge to increase an overall horizontal cross-sectional area occupied by the flowing material. The material subflows leaving the spreader assembly are directed to a basket assembly having a plurality of angled baffles mechanically connected together. The baffles of the basket assembly can cause the material subflows to converge to decrease an overall horizontal cross sectional area of the flowing material, and can unify the material subflows into a single flow. The basket assembly is operatively connected to a sensing device (e.g., load cell), which can be secured to the spreader assembly above the basket. Material moving along surfaces of the baffles of the basket can cause small displacements of the basket, and the sensing device can generate an output signal as a function of displacement of the basket. Orientations of the baffles allow horizontal force components exerted on the basket to net to approximately zero, resulting in a relatively linear and vertical force component exerted on the sensing device. The output signal allows the flow rate and the weight of solid materials displaced to be determined. The flow scale is relatively compact, and allows accurate flow measurements within relatively small vertical spaces. Even material flows with relatively large diameters can be handled by the flow scale of the present invention without any significant vertical height penalty. Examples of applications of the present invention include use in discharge ports of augers, silos, on grain elevator slide chutes, conveyors, etc.

Figure 1:
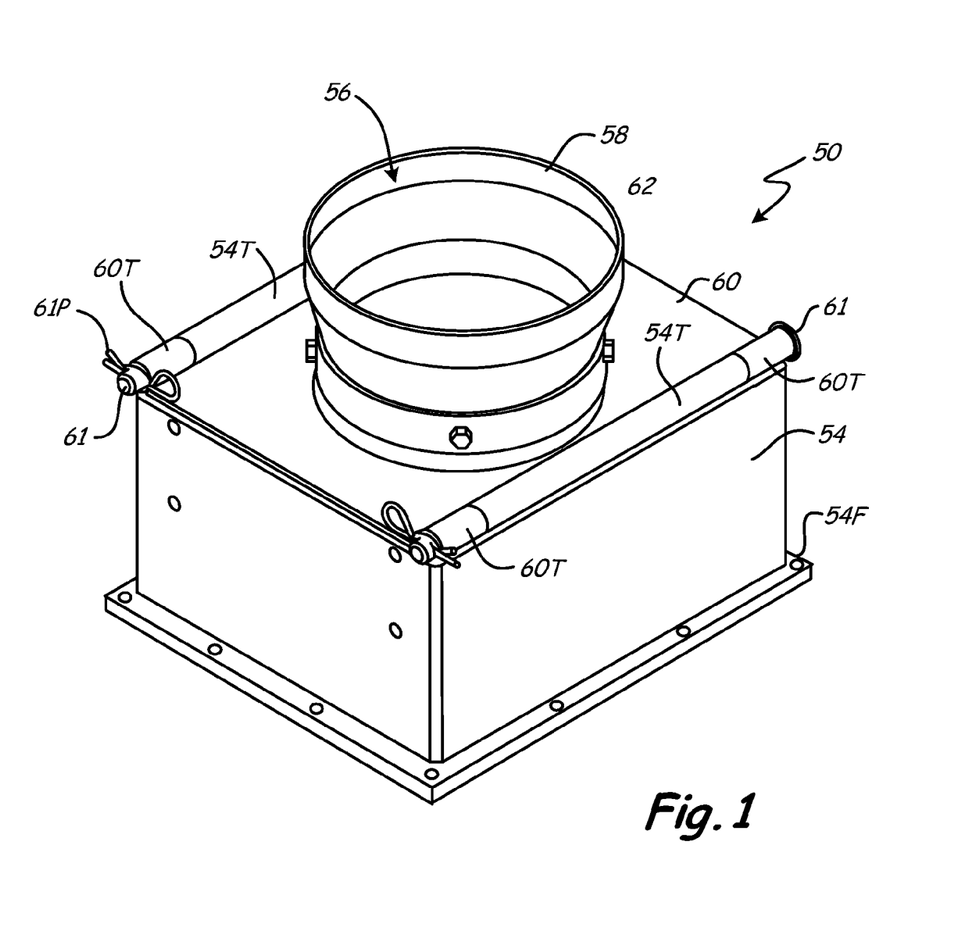
FIG. 1 is a perspective view of a flow scale according to the present invention.
Figure 2:
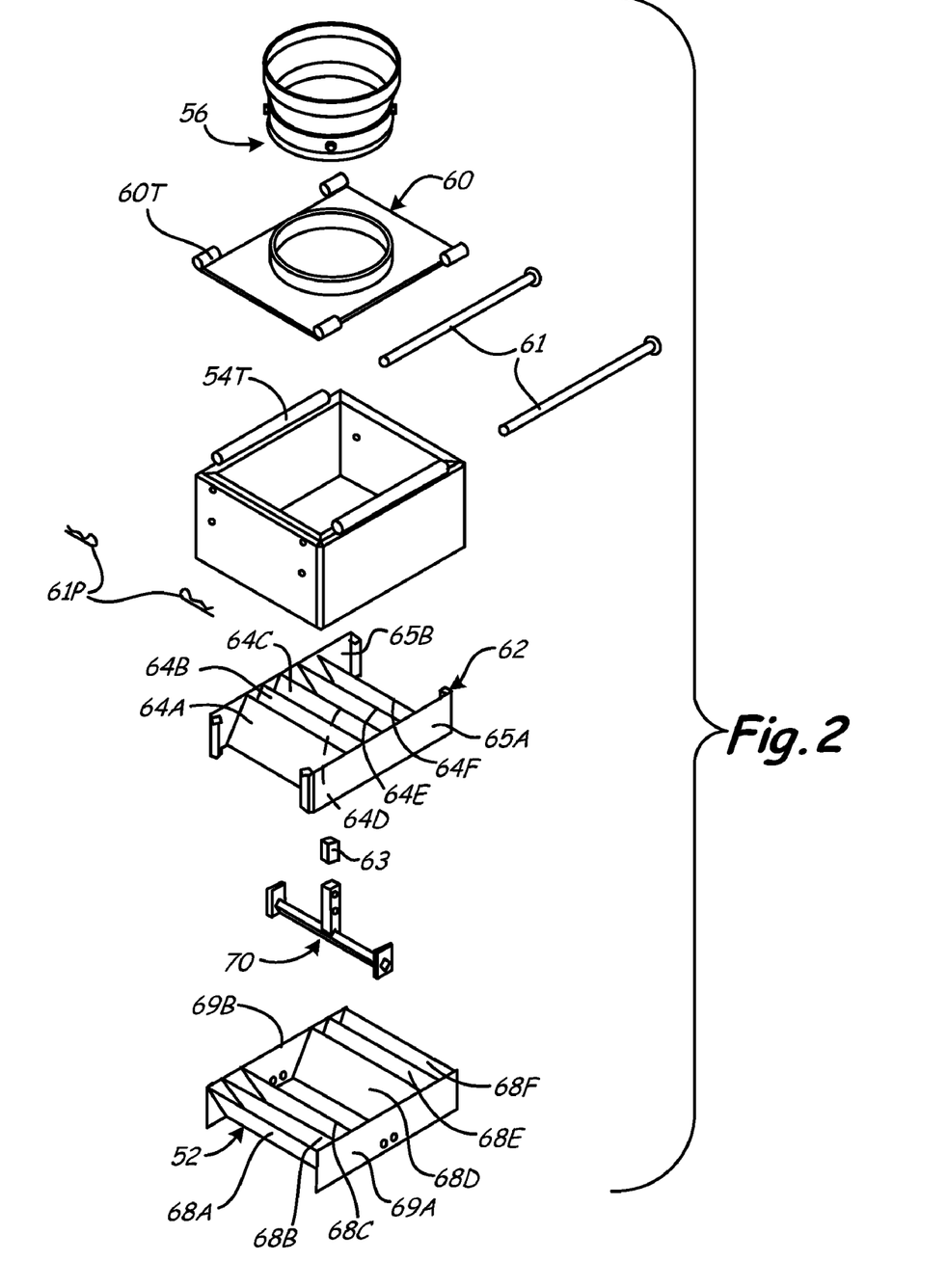
FIG. 2 is an exploded perspective view of the flow scale.
Figure 3:
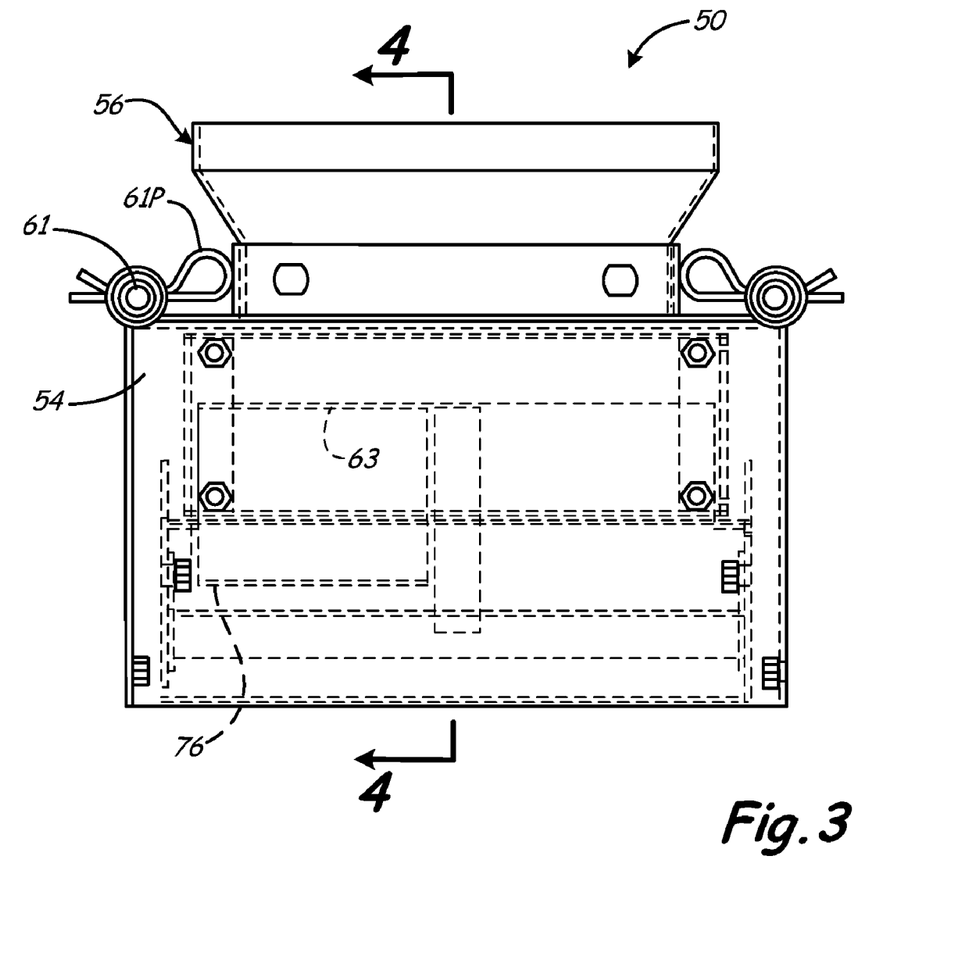
FIG. 3 is a side elevation view of the flow scale.
Figure 4:
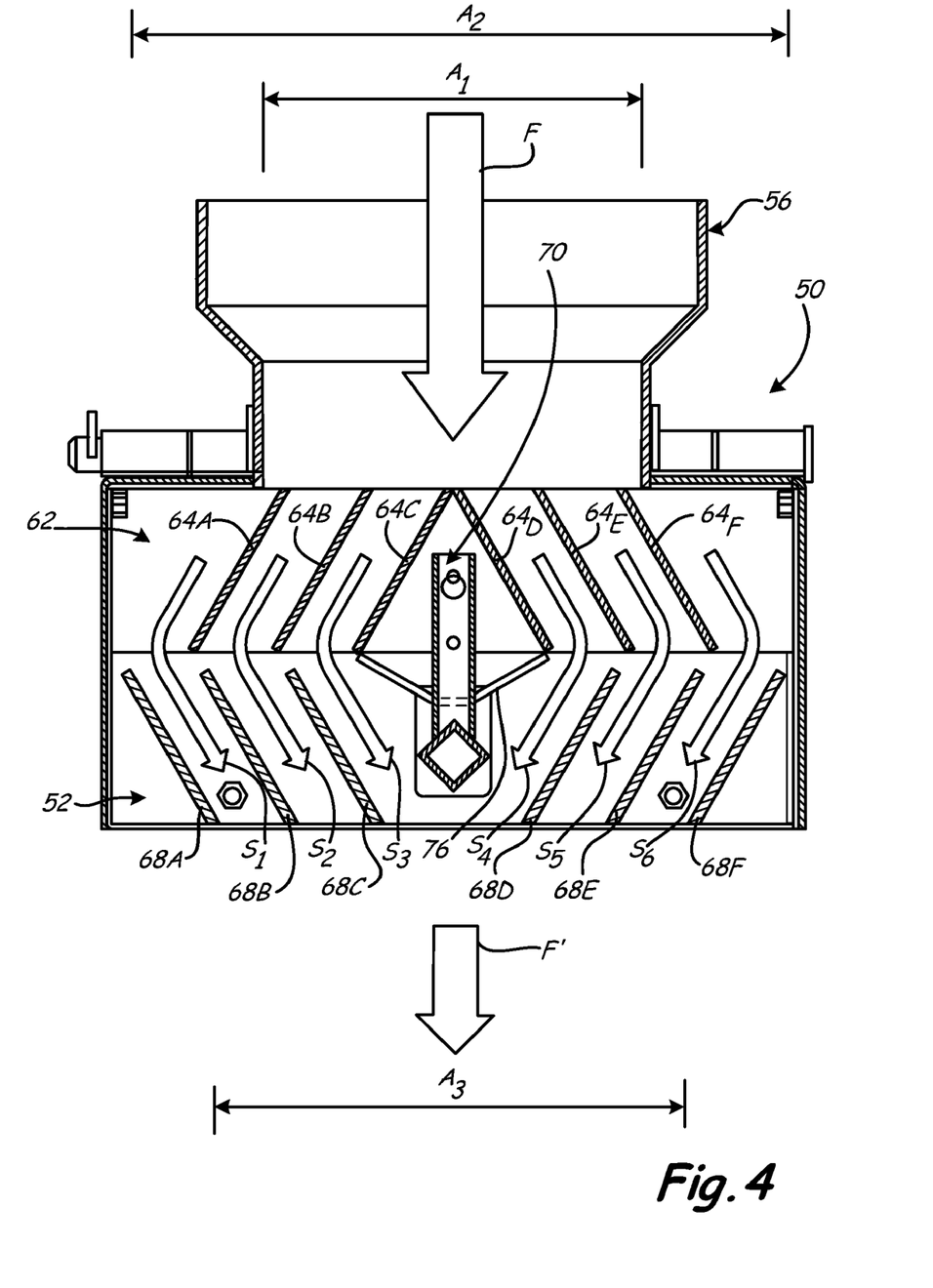
FIG. 4 is a cross-sectional view of the flow scale, taken along line 4-4 of FIG. 3.

FIG. 1 is a perspective view of a flow scale 50, and FIG. 2 is an exploded perspective view of the flow scale 50. FIG. 3 is a side elevation view of the flow scale 50, and FIG. 4 is a cross-sectional view of the flow scale 50 taken along line 4-4 of FIG. 3. The flow scale 50 includes a basket assembly 52 (also called a weigh basket), a housing (or scale body) 54 with an input structure (or transition) 56 to accept materials flows, such as from a fiber feeder, auger, or other source. The input structure 56 can include an inlet spout 58 that defines an internal passageway that is generally circular in cross-section, and a cover plate 60 positioned on the top of the housing 54. Pins 61, retained by cotter pins 61P or other suitable means, can secure tubes 60T on the cover plate 60 of the input structure 56 to tubes 54T on the housing 54 in a double hinged configuration to allow for adjustment in operatively connecting the flow scale 50 to other components that supply material. In alternative embodiments, the pins 61 can be secured to suitable mounting structures (not shown) in order to suspend the flow scale from a mounting location located above or near the input structure 56. In the illustrated embodiment, the housing 54 is a generally rectangular box shaped structure, forming an interior volume that is open on top and bottom. In further embodiments, the particular shape, proportions and size of the components of the flow scale 50 (e.g., of the housing 54) can vary as desired for particular applications. The housing 54 can be made of stainless steel, or another suitable material. Moreover, a flange 54F of the housing 54 can be connected to a chute, conduit or other suitable structure (not shown) opposite the input structure 56 to accept or guide material flows leaving the flow scale 50.

During operation, material flows are directed from the input structure 56 into the housing 54, and the material flows are allowed to fall into and through the flow scale 50 in a substantially vertical direction by way of gravity. The material flows that enter from the top of the housing 54 fall to a spreader assembly (or spreader basket or diverter) 62. Downstream from (i.e., below) the spreader assembly, the material flows contact and pass the basket assembly 52. Contact between the material flows and the basket assembly 52 displace the basket assembly 52 relative to the spreader assembly 62. A load cell 63 is operatively connected between the basket assembly 52 and the spreader assembly 62 to sense displacement of the basket assembly 52. After passing the basket assembly 52, material flows can exit the flow scale 50 through the open bottom of the housing 54. Additional details of the configuration and operation of the flow scale 50 will be appreciated in light of the discussion that follows.

Figure 5:
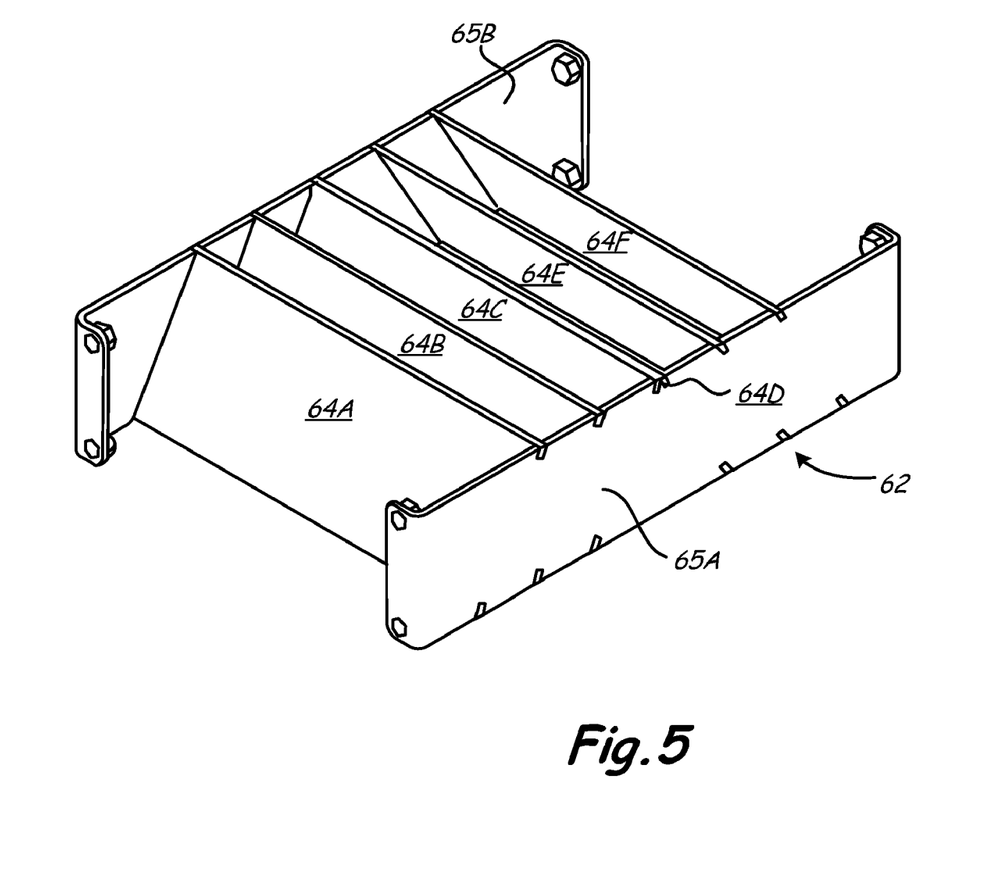
FIG. 5 is a perspective view of a spreader assembly of the flow scale.

FIG. 5 is a perspective view of the spreader assembly 62 of the flow scale 50. The spreader assembly 62 is fixedly secured to side walls of the housing 54, and can be made of stainless steel or other suitable materials. The spreader assembly 62 includes a plurality of baffles (also called fins or plates or blades) 64A-64F (the baffles are collectively referred to by reference number 64) each fixedly connected to front and back spreader walls 65A and 65B and each arranged at an angle (e.g., about 30°) with respect to vertical to define a plurality of passages, with each passage located adjacent to one of the baffles 64A-64F. In the illustrated embodiment, each of the baffles 64 is substantially planar in configuration and the baffles 64 are all substantially horizontally aligned.

As shown in FIG. 4, the spreader assembly 62 diverts an incoming material flow along flow path F into a plurality of subflows $S_1$-$S_6$ that can each be at an angle (e.g., approximately 30°) with respect to vertical. Material can contact the baffles 64 of the spreader assembly 62, and thereby be directed to a given one of the subflows $S_1$-$S_6$. The plurality of passages of the spreader assembly 62 can be arranged in different groups or sets, with the plurality of passages for the plurality of subflows $S_1$-$S_6$ arranged substantially parallel to each other within each group and with different groups orienting the respective subflows $S_1$-$S_6$ in different directions. In the illustrated embodiment, two sets of the baffles 64 are provided, with the baffles 64A-64C of a first set (corresponding to the subflows $S_1$-$S_3$) arranged parallel to one another at one angle (e.g. approximately 30° with respect to vertical) and with the baffles 64D-64F of a second set (corresponding to the subflows $S_4$-$S_6$) arranged parallel to one another at another angle (e.g., approximately 330° or −30° with respect to vertical). In that way, the spreader assembly 62 can provide a plurality of passages each configured to direct one of the subflows $S_1$-$S_6$ such that the first set of subflows $S_1$-$S_3$ diverge from the second set of subflows $S_4$-$S_6$, that is, each set is directed generally outward from a central location. Where the first and second sets of the baffles 64 diverge, an overall cross-sectional area of the flow path F increases as the subflows $S_1$-$S_6$ pass the spreader assembly 62. In other words, the flow path F has a first cross-sectional area at the inlet structure 56, corresponding to a dimension $A_1$ shown in FIG. 4, and downstream has a second, larger cross-sectional area, corresponding to a dimension $A_2$ shown in FIG. 4, downstream when leaving the spreader assembly 62.

Figure 6:
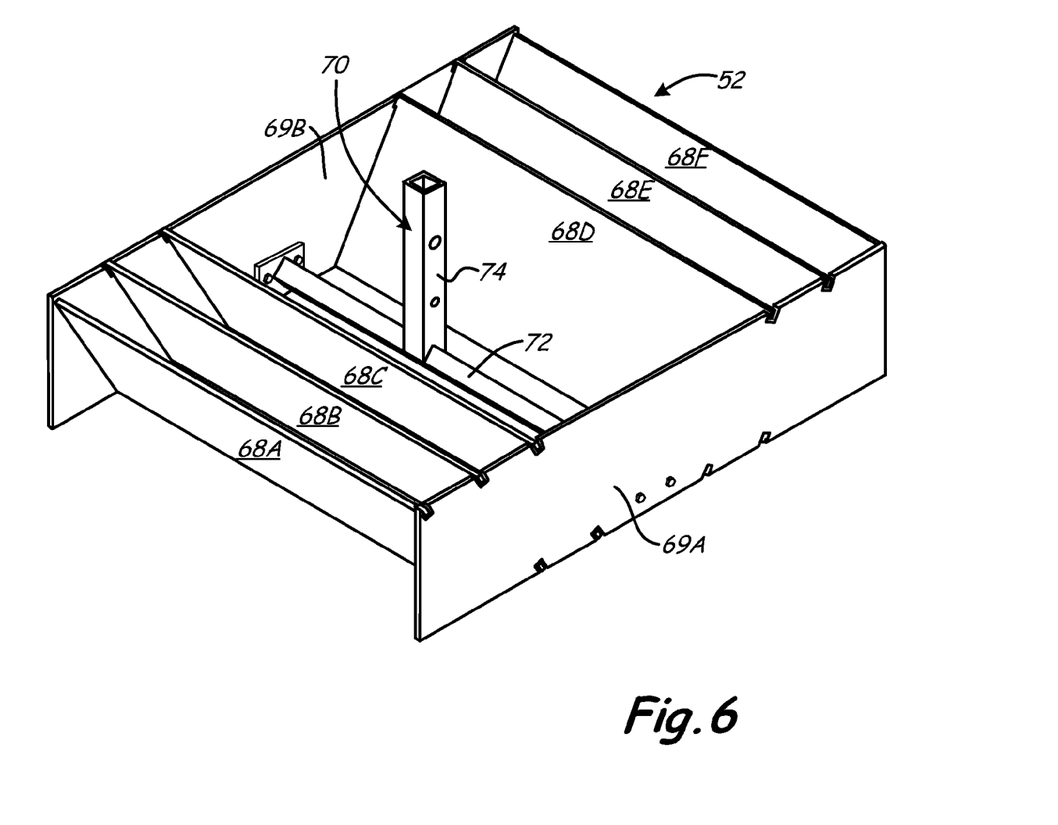
FIG. 6 is a perspective view of a basket assembly and a load cell connection bar of the flow scale.

FIG. 6 is a perspective view of a portion of the flow scale 50, illustrating the basket assembly 52. The basket assembly 52 is a bottomless structure that includes a plurality of baffles (also called fins or plates or blades) 68A-68F (collectively referred to by reference number 68) each connected to basket walls 69A and 69B to define a plurality of passages. Each passage is located adjacent to one of the baffles 68A-68F and corresponds to one of the plurality of material subflows $S_1$-$S_6$ delivered to the basket assembly 52 from the spreader assembly 62. The basket assembly 52 can be made of stainless steel, or other suitable materials. The plurality of baffles 68 of the basket assembly 52 are each arranged at an angle (e.g., about 30°) with respect to vertical. In the illustrated embodiment, each of the baffles 68 is substantially planar in configuration, and the baffles 68 are all substantially horizontally aligned (i.e., substantially perpendicular to the substantially vertical flow path F).

As shown in FIG. 4, the basket assembly 52 accepts each of the plurality of subflows of material $S_1$-$S_6$ from the spreader assembly 62 in a separate passage located adjacent to one of the baffles 68A-68F. The plurality of passages of the basket assembly 52 are arranged in different sets (or groups), with the plurality of passages for the plurality of subflows arranged substantially parallel to each other within each set and with different groups orienting subflows in different directions. In the illustrated embodiment, two sets of the baffles 68 are provided, with the baffles 68A-68C of a first set (corresponding to the subflows $S_1$-$S_3$) arranged parallel to one another at one angle (e.g. approximately 330° or −30° with respect to vertical) and with the baffles 68D-68F of a second set (corresponding to the subflows $S_4$-$S_6$) arranged parallel to one another at another angle (e.g., approximately 30° with respect to vertical). The baffles 68 of the basket assembly 52 can be arranged at generally opposite angles from the baffles 64 of the spreader assembly 62, that is, the baffles 64 of the spreader assembly 62 can angle outward and the baffles 68 of the basket 52 can angle inwards. In that way, the basket assembly 52 can provide a plurality of passages each configured to direct one of the subflows $S_1$-$S_6$ such that the first set of subflows $S_1$-$S_3$ converge with the second set of subflows $S_4$-$S_6$, that is, each set is directed generally inward toward a central location. When exiting the basket assembly 52 and the flow scale 50, the subflows $S_1$-$S_6$ can be unified as a single outlet flow F'. Where the first and second sets of the baffles 68 converge, an overall cross-sectional area of the flow path F (at the outlet flow path F') decreases as the subflows $S_1$-$S_6$ pass the basket assembly 52. In other words, the flow path F has a cross-sectional area, corresponding to the dimension $A_2$ shown in FIG. 4, when leaving the spreader assembly 62 and approaching the basket assembly 52, and has a another, smaller cross-sectional at the outlet flow path F', corresponding to a dimension $A_3$ shown in FIG. 4. The cross-sectional area corresponding to the dimension $A_3$ can be approximately equal to the cross-sectional area corresponding to the dimension $A_1$, or can be greater or smaller than the cross-sectional area corresponding to the dimension $A_1$ in various embodiments.

During operation, the spreader assembly 62 directs one of the material subflows $S_1$-$S_6$ against each of the baffles 68A-68F of the basket 52. The sets of the baffles 68 of the basket 52 are configured in the illustrated embodiment in a symmetrical manner to produce zero net effect from the baffle angles, thereby providing a relatively accurate weight measurement of the flow of material along the flow path F. In other words, horizontal force components exerted on the basket assembly 52 by the material subflows $S_1$-$S_6$ net to approximately zero.

A load cell connection bar (also called a connection structure) 70, as shown in FIGS. 2, 4 and 6, is fixedly secured to the basket walls 69A and 69B of the basket assembly 52. The load cell connection bar 70 can be substantially T-shaped and include a horizontally-extending cross bar 72 secured at opposite ends to the basket 52 and a vertical member 74 operably connected to the load cell 63. In the illustrated embodiment, the cross bar 72 is tubular in shape with a substantially rectangular cross-section, and is arranged such that upward facing surfaces of the cross bar 72 are arranged at approximately 45° with respect to vertical (i.e., with a longitudinal edge positioned to face upstream) to help reduce a risk of accumulation of material on the cross bar 72 during use.

The load cell 63, which functions as a sensor for the flow scale 50, can be a model "YJ" single point load cell available from Sentran, LLC (Ontario, Calif.), or another suitable commercially available load cell. The load cell 63 can be fixed to the spreader assembly 62, and the basket 52 suspended from the load cell 63 by the load cell connection bar 70, such that relative movement between the basket 52 and the spreader assembly 62 is possible. The load cell 63 can be positioned beneath and between the two divergent, innermost baffles 64C and 64D of the spreader assembly 62 that meet at a linearly-extending apex at their top, upstream edges, and the bottom of the load cell 63 can be supported by a load cell base support 76 that extends between and is connected to bottom, downstream edges of the two innermost spreader assembly baffles 64C and 64D. In this way, the load cell 63 is shielded from the flow of material through the flow scale 50 along the flow path F.

The components for passing material through the flow scale 50 (e.g., the spreader assembly 62 and the basket 52, in that order) can be at least approximately 1.905 cm (0.75 inch) wider in every horizontal direction as the component feeding it (i.e., components are horizontally larger than ones immediately upstream), which can aid material flow through the flow scale 50. Furthermore, basket assembly 52 can be vertically spaced from the spreader assembly 62 by a gap of approximately 1.27 cm (0.5 inch) to reduce a risk of undesirable accumulation of material in between those components during use. Additionally, the housing 54 can be horizontally spaced from the basket assembly 52 by a gap in all directions to help reduce a risk of undesirable material accumulation in between those components during use.

During operation, material falls along the flow path F through the spreader assembly 62 and into the basket assembly 52 by way of gravity. Material flow that contacts the plurality of baffles 68 of the basket assembly 52 flows generally downward along surfaces of the baffles 68 by way of gravity, and the collective weight of the material on the basket assembly 52 pulls down on the load cell connection bar 70 causing the load cell 63 to compress. The downward force collectively exerted on the basket 52 is sensed by the load cell 63, which can generate an output signal indicative of the material flow as a function of movement of the basket 52 relative to the load cell 63. More particularly, material seeking a straight path downward through the housing 54 meets with the resistance of the baffles 68 of the basket assembly 52 (e.g., oriented at about 30° from vertical). Weight of the material against this resistance places a net linear downward force on the baffles 68 of the basket assembly 52. In passing the spreader assembly 62 and the basket 52, material is spread apart and then gathered to feed the basket 52 in a controlled manner to allow all the material the approximately same weighing time. While the basket 52 does experience impact from material leaving the oppositely angled baffles 64 of the spreader assembly 62, the load cell 63 experiences little if any of the impact force. The opposing impact forces of the material striking the different groups of differently angled baffles 68 of the basket 62 effectively cancel each others' horizontal impact force components, that is, the net horizontal impact force component is approximately zero. In that way, the load cell 63 sees negligible force as off-center loading in the manner of prior art impact flow scales.

The flow scale 50 can be rotated about a vertical axis during installation for the most even distribution of material on either side of the innermost baffles 64 of the spreader assembly 62. Although the load cell 63 can be selected to be tolerant of off-center loading (within limits), the flow scale 50 can be rotated, at the time of installation, about the vertical axis (i.e., on a horizontal plane) for applications feeding the scale 50 in an off-center approach.

Those of ordinary skill in the art will recognize that the present invention provides numerous advantages and benefits. For example. the input structure, spreader assembly, and basket components are arranged to cup materials feeding through the flow scale in the vertical direction, which helps to keep the material contained and channeled so as to help keep spillage from adversely affecting flow scale accuracy. Substantially the entire weight of flowing material is sensed with a single load cell located at or near a center of the flow scale according to an embodiment of the present invention, without a need for mechanical levers and pivot points, pulleys and cables, and/or one or more additional sensing devices (e.g., additional load cells) that could cause measurement inaccuracies. Moreover, the flow scale of the present invention is relatively compact, particularly in a vertical dimension. This allows the flow scale to be installed in a variety of locations, including those where prior art flow scales would not fit. The present invention also easily retrofits into existing systems, because material can go straight in and straight out of the housing in the vertical direction, whereas prior art flow scales with impact plates generally need to slide material into the impact plate from the side causing a "dog leg" in the flow path and making it difficult to retrofit such a flow scale into existing flow path plumbing. The present invention is able to help reduce vertical height of the flow scale and provide substantially linear loading to the load cell. This is because the baffles of the spreader assembly expand an overall cross-sectional area of material flow horizontally and control substantially the entire material flow to a relatively consistent velocity to evenly feed the basket assembly. The distribution of material flow over a greater horizontal area helps limit the overall vertical height of the flow scale, which the configuration of the spreader assembly and the basket assembly maintain a relatively high degree of measurement accuracy. Indeed, the configuration of the flow scale of the present invention minimizes vibration of the basket assembly such that a filter (e.g., filter capacitor) is not required to filter out "bounce" (i.e., vibration) from a measurement signal. A high degree of mechanical and/or electronic filtering was required with prior art flow scales with vertically hanging impact plates, and such filtering tends to cause measurement inaccuracies.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For instance, the number of baffles and material subflow passages can vary in alternative embodiments. Also, size and shape of the flow scale can vary, such as the inner dimensions (e.g., distances between side walls, between baffles, and between the basket and spreader assemblies). Moreover, purely planar basket baffles can be replaces with bent baffles, with an upstream portion of each baffle of the basket being planar at about 30° from vertical and the last, downstream inch of each baffle bent to be about 45° from vertical, allowing for more load cell signal in applications where the maximum flow rate of material being fed to the flow scale is not restricting the flow of the system.

The invention claimed is:

1. A flow scale apparatus comprising:
 a substantially vertical flow path along which material can flow;
 a plurality of spreader baffles substantially aligned horizontally and positioned in the flow path;
 a plurality of basket baffles located downstream from the spreader baffles in the flow path and substantially aligned horizontally, the basket baffles secured together, wherein the basket baffles are configured to be displaceable such that portions of the material in the flow path contact each of the basket baffles to displace the basket baffles relative to the spreader baffles as a function of a weight of the material in the flow path;
 a sensor for sensing displacement of the basket baffles and generating an output signal;
 a connection structure fixedly secured relative to each of the basket baffles, wherein the connection structure is operably connected to the sensor and moves with the basket baffles; and
 a housing, wherein the spreader baffles are each secured to the housing, and wherein the connection structure is positioned within the housing.

2. The apparatus of claim 1, wherein the sensor is a load cell.

3. The apparatus of claim 1, wherein the basket baffles are grouped as a first set and a second set, the first set of basket baffles being substantially planar and arranged substantially parallel to each other at a first angle, the second set of basket baffles being substantially planar and arranged substantially parallel to each other at a second angle, and wherein the first and second angles are configured such that a subflow within the flowpath provided by the first set of basket baffles converges with respect to a subflow within the flow path provided by the second set of basket baffles.

4. The apparatus of claim 3, wherein first and second sets of basket baffles are configured such that a net horizontal force component from the subflows is approximately zero.

5. The apparatus of claim 1, wherein the spreader baffles are grouped as a first set and a second set, the first set of spreader baffles being substantially planar and arranged substantially parallel to each other at a first angle, the second set of spreader baffles being substantially planar and arranged substantially parallel to each other at a second angle, and wherein the first and second angles are configured such that a subflow within the flowpath provided by the first set of spreader baffles diverges with respect to a subflow within the flow path provided by the second set of spreader baffles.

6. The apparatus of claim 1, wherein the connection structure is substantially T-shaped and includes a substantially horizontal cross bar and a substantially vertical bar.

7. The apparatus of claim 1, wherein an innermost pair of the spreader baffles have upstream edges that meet at a linearly extending apex, and wherein the sensor is positioned beneath the apex of the innermost pair of the spreader baffles.

8. A flow scale apparatus for sensing generally vertically falling flows of solid materials, the apparatus comprising:
 a flow path defined through a housing, wherein flows of solids materials can pass along the flow path by way of gravity;
 a spreader assembly comprising:
  a first set of substantially planar spreader baffles, wherein the spreader baffles of the first set are arranged substantially parallel to each other at a first angle;
  a second set of substantially planar spreader baffles a plurality of substantially planar baffles, wherein the spreader baffles of the second set are arranged substantially parallel to each other at a second angle that is different from the first angle, and
  wherein the spreader baffles of the first and second sets are fixedly positioned relative to the flow path and are configured to separate the flow path into a plurality of subflows of solid material;
 a basket assembly located downstream from the spreader assembly, the basket assembly comprising
  a first set of substantially planar basket baffles, wherein the basket baffles of the first set are arranged substantially parallel to each other at a third angle;
  a second set of substantially planar basket baffles a plurality of substantially planar baffles, wherein the basket baffles of the second set are arranged substantially parallel to each other at a fourth angle that is different from the third angle,
  wherein each of the plurality of subflows of solid material are configured to contact one of the basket baffles of the first or second sets, and
  wherein the basket assembly is configured to allow movement relative to the spreader assembly due to contact with the subflows of solid material;
 a connection structure secured to the basket assembly and positioned within the housing, wherein the connection structure is fixedly secured relative to each of the first and second sets of basket baffles, and wherein the connection structure moves with the first and second sets of basket baffles; and
 a load cell operably connected between the connection structure and the spreader assembly to sense a vertical displacement of the basket assembly.

9. The apparatus of claim 8, wherein first and second sets of basket baffles are configured such that a net horizontal force component from the subflows of solid material is approximately zero.

10. The apparatus of claim 8, wherein the first and fourth angles are each approximately 30° with respect to vertical.

11. The apparatus of claim 10, wherein the second and third angles are each approximately −30° with respect to vertical.

12. The apparatus of claim 8, wherein the first and second sets of spreader baffles are each secured to the housing.

13. The apparatus of claim 8, wherein the connection structure is substantially T-shaped and includes a substantially horizontal cross bar and a substantially vertical bar.

14. The apparatus of claim 13, wherein the substantially horizontal cross bar is tubular with a substantially rectangular cross-section, and wherein the substantially horizontal cross bar is arranged such that an upward facing surface of the substantially horizontal bar is arranged at approximately 45° with respect to vertical.

15. The apparatus of claim 8, wherein the spreader assembly is configured such that those subflows created by the first set of spreader baffles diverge from those subflows created by the second set of spreader baffles.

16. A method for sensing flows of solid materials within a limited vertical space, the method comprising:
providing a flow of solid material that falls in a substantially downward direction by way of gravity, wherein the flow of solid material has an initial overall horizontal cross-sectional area $A_1$ defined by a perimeter of the flow of solid material;
dividing the flow of solid material into a plurality of subflows with a spreader assembly, wherein the plurality of subflows diverge to increase the overall horizontal cross-sectional area of the flow of solid material to overall horizontal cross-sectional area $A_2$;
impinging each of the plurality of subflows upon one of a plurality of baffles commonly secured in a basket assembly, wherein the baffles of the basket assembly urge the plurality of subflows to converge to reduce the overall cross-sectional area of the flow of solid material impinging upon the baffles of the basket assembly to overall horizontal cross-sectional area $A_3$;
sensing linear displacement of the basket assembly in a substantially vertical direction relative to the spreader assembly, wherein a net horizontal force component on the basket assembly is approximately zero; and
generating an output signal usable to indicate of at least one of: a weight of material displaced by the flow of solid material and a flow rate of the flow of solid material.

17. A flow scale apparatus comprising:
a flow path along which material can flow;
a plurality of spreader baffles configured to increase a cross-sectional area of the flow path in a horizontal direction from horizontal cross-sectional area $A_1$ to horizontal cross-sectional area $A_2$ defined by an overall perimeter of the flow path, wherein at least two of the plurality of spreader baffles are arranged substantially parallel to each other;
a plurality of basket baffles located downstream from the spreader baffles and configured to decrease a cross-sectional area of the flow path from horizontal cross-sectional area $A_2$ to horizontal cross-sectional area $A_3$ as material impinges the plurality of basket baffles, wherein the plurality of basket baffles are commonly secured to a support structure, and wherein the plurality of basket baffles are arranged in a row; and
a load cell configured to sense linear displacement of the plurality of basket baffles and generate an output signal as a function of the displacement of the plurality of basket baffles due to impingement of material on the plurality of basket baffles.

18. The apparatus of claim 17, wherein the plurality of basket baffles are each substantially planar, and wherein the plurality of spreader baffles are each substantially planar.

19. The apparatus of claim 1, wherein there are an equal number of spreader baffles and basket baffles, wherein each spreader baffle directs a subflow within the flowpath toward a corresponding one of the basket baffles, and wherein displacement of the basket baffles is sensed substantially vertically relative to the spreader baffles.

20. The apparatus of claim 19, wherein a net horizontal force component of the subflows is approximately zero.

* * * * *